Nov. 28, 1967   G. C. CHAPMAN   3,354,748
VARIABLE SPEED DRIVE
Filed June 9, 1965   3 Sheets-Sheet 2
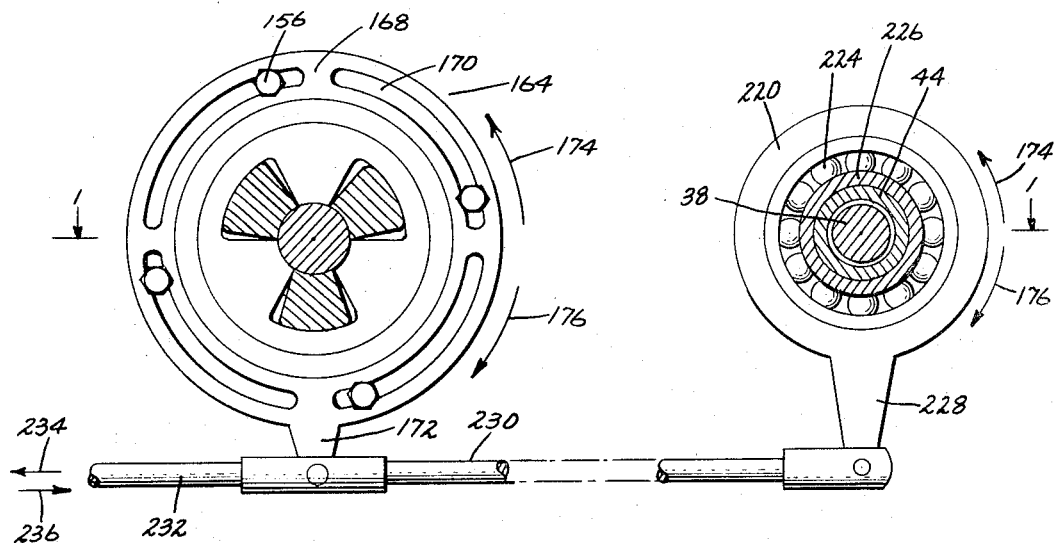
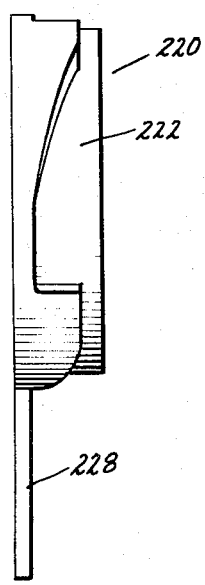
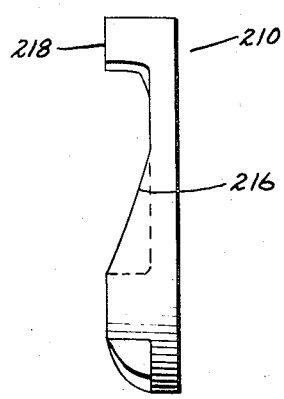
Inventor:
Gale C. Chapman,
by Hood, Gust & Irish
Attorneys Nov. 28, 1967     G. C. CHAPMAN     3,354,748
VARIABLE SPEED DRIVE Filed June 9, 1965     3 Sheets-Sheet 3

Inventor:
Gale C. Chapman,
by Hood, Gust & Irish
Attorneys.

United States Patent Office 3,354,748
Patented Nov. 28, 1967

3,354,748
VARIABLE SPEED DRIVE
Gale C. Chapman, New Haven, Ind.
(121 N. Main St., Milford, Ind. 46542)
Filed June 9, 1965, Ser. No. 462,572
4 Claims. (Cl. 74—689)

ABSTRACT OF THE DISCLOSURE

A variable speed drive comprising a drive shaft, a planetary gear train including first and second input shafts and an output shaft, means coupling the drive shaft and the first input shaft for driving the same at a constant predetermined speed, and selectively variable means coupling the drive shaft and second input shaft for driving the same at selectively variable speeds from above to below the speed of the drive shaft. In accordance with the present invention, the planetary gear train is arranged so that, by varying the speed of the second input shaft above and below the speed of the drive shaft, the speed of the output shaft can be varied from above the speed of the drive shaft through zero to a reversed direction of rotation.

---

This invention relates generally to variable speed drives and, more particularly, to a variable speed drive of the type which provides a wide range of output speed variation through zero by the use of a differential with constant and variable speed inputs thereto.

There are numerous requirements for a continuously variable speed drive which will provide a wide variation of output speeds from a constant speed power source, such as an electric motor, and it is further frequently desirable that such a variable speed drive be capable of reversing the direction of rotation of the output shaft. Numerous variable speed drives have been proposed of the type employing a differential with constant and variable speed inputs, the variable speed input being provided by a belt drive employing adjustable ratio pulleys. All of such variable speed drives known to the present applicant have had certain inherent defects; some of them have been incapable of reversal or of even providing zero output speed, others have provided a limited range of output speeds, and still others have required an excessively wide range of speed variation by the adjustable ratio pulleys in order to provide a desirably wide range of output speeds.

It is accordingly an object of the present invention to provide an improved variable speed drive.

Another object of the invention is to provide an improved variable speed drive of the type employing a differential with constant and variable speed inputs.

A further object of the invention is to provide an improved variable speed drive of the type employing a differential with constant and variable speed inputs which is capable of providing a wide range of output speeds from above the speed of the driving source through zero to a reversed direction of rotation with a smaller speed variation in the variable speed input than has heretofore been provided.

In accordance with the broader aspects of the invention, a variable speed drive is provided having a drive shaft adapted to be connected to a constant speed source of power, such as an electric motor. A planetary gear train is provided including a first input shaft having a driving spur gear thereon. A second input shaft is provided coaxial with the first input shaft and having a pinion carrier thereon which carries a pinion shaft. An output shaft is provided coaxial with the two input shafts and having a driven spur gear thereon. First and second spur pinions are provided on the pinion shaft respectively meshing with the driving and driven gears, the driving and driven gears and the pinions forming a step-up speed ratio between the driving and driven gears. Means are provided coupling the drive shaft and the first input shaft for driving the driving spur gear at a constant predetermined speed and selectively variable means are provided coupling the drive shaft and the second input shaft for driving the pinion carrier at selectively variable speeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a fragmentary cross-sectional view taken generally along the line 2—2 of FIG. 1;

FIG. 3 is a side view of one of the ratio adjusting members;

FIG. 4 is a side view of the bushing which cooperates with the ratio adjusting member of FIG. 3;

Figure 1:
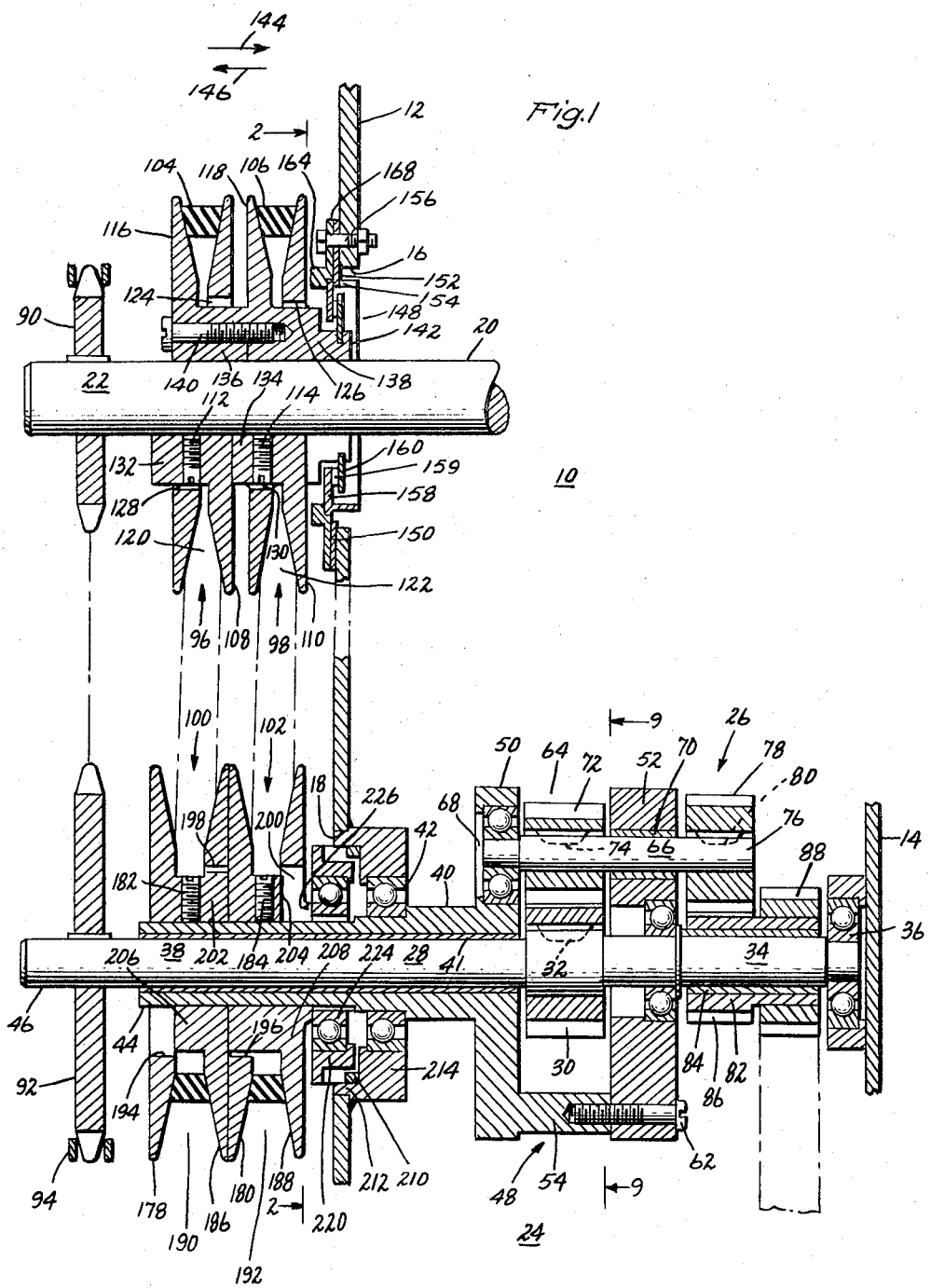
FIG. 1 is a cross-sectional view showing the improved variable speed drive of the invention.
Figure 5:
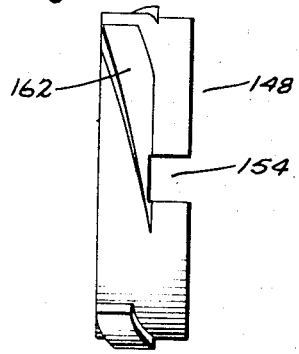
FIG. 5 is a side view of the other ratio adjusting bushing.
Figure 6:
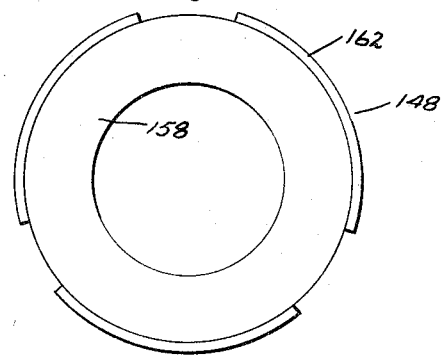
FIG. 6 is an end view of the bushing of FIG. 5.
Figure 7:
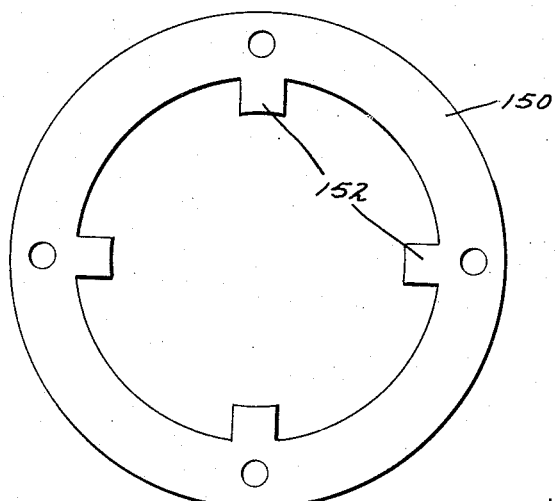
FIG. 7 is an end view of the retaining member employed with the bushing of FIG. 5.
Figure 8:
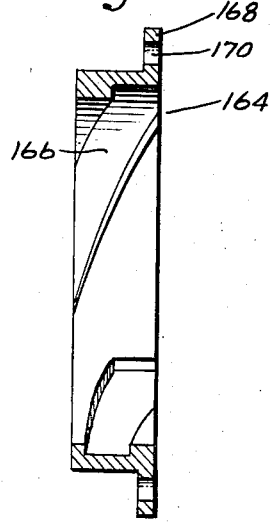
FIG. 8 is a side-cross-sectional view of the other ratio adjusting member which cooperates with the bushing and retaining member of FIGS. 5, 6 and 7.

Referring now to the figures of the drawing, there is shown a variable speed drive, generally identified at 10 in FIG. 1, supported on a frame assembly including spaced parallel frame elements 12, 14, frame element 12 having spaced circular openings 16, 18 formed therethrough. A drive shaft 20 is provided adapted to be connected to a suitable constant speed power source (not shown) such as an electric motor or a gasoline engine. Drive shaft 20 extends coaxially through opening 16 in frame 12 and has an extension portion 22 disposed on the side of frame element 12 remote from the cavity 24 defined between frame elements 12, 14.

A planetary gear train 26 is provided having an input shaft 28 with a spur gear 30 mounted thereon for rotation therewith, as by a suitable key 32. Input shaft 28 has an extension portion 34 journaled in a suitable bearing 36 mounted on frame element 14, as shown. Input shaft 28 extends coaxially through opening 18 in frame element 12 and has another extension portion 38 disposed on the side of frame element 12 remote from cavity 24.

Figure 9:
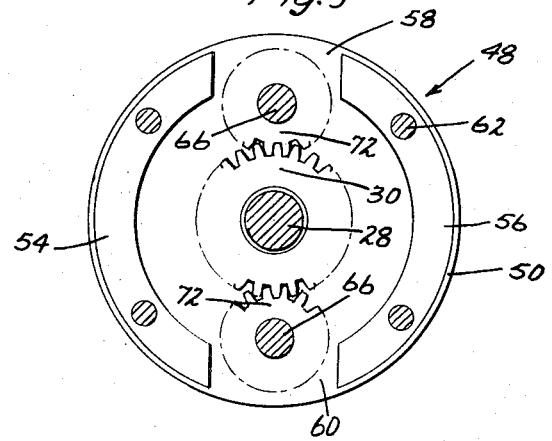
FIG. 9 is a cross-sectional view taken along the line 9—9 of FIG. 1.

Planetary gear train 26 is provided with another input shaft 40 in the form of a hollow sleeve coaxially surrounding input shaft 28 and rotatably supporting the same by means of bearing 41 which may be a sleeve bearing as shown, or an anti-friction bearing. Input shaft sleeve 40 is rotatably supported by a suitable bearing 42 mounted on frame element 12 as shown. Input shaft sleeve 40 has an extension portion 44 extending on the side of frame element 12 remote from cavity 24. It will be observed that extension 38 of input shaft 28 has a portion 46 extending beyond the axial end of extension 44 of input shaft 40. Input shaft sleeve 40 has a pinion carrier 48 mounted thereon for rotation therewith, carrier 48 comprising a first part 50 and a cover member 52. Referring specifically to FIG. 9, part 50 of pinion carrier 48 has two part-cylindrical portions 54, 56 extending axially therefrom defining diametrically opposite spaces 58, 60 therebetween. Cover member 52 is secured to portions 54 by suitable threaded fasteners 62. Pinion carrier part 50 and cover member 52 thus define a cavity 64 therebetween in which spur gear 30 is positioned.

Pinion carrier 48 carries a pair of pinion shafts 66 in spaced parallel relationship with input shafts 28, 40, pinion shafts 66 being rotatably supported by suitable bearings 68, 70 respectively mounted in part 50 and cover member 52. Bearing 70 may be an anti-friction bearing rather than a sleeve bearing as shown. A first pair of pinions 72 are secured to pinion shaft 66 in spaces 58, 60, as by suitable key 74, and mesh with the drive gear 30. Pinion shafts 66 have extension portions 76 extending beyond cover plate member 52 toward frame element 14 and another pair of pinions 78 are secured thereto, as by suitable keys 80. Each of pinions 72, 78 thus rotate together.

An output shaft sleeve 82 is provided coaxially surrounding extension portion 34 of input shaft 28 and journaled thereon by means of a suitable sleeve or anti-friction bearing 84. A driven spur gear 86 is secured to or formed on the output shaft sleeve 82 and meshes with the spur pinions 78, as shown. An output gear 88 is secured to the output shaft sleeve 82 and is adapted to drive the driven apparatus (not shown).

An important feature of the present invention is the provision of spur gearing in the planetary gear train 26, the term "spur gearing" referring to external, axially extending teeth and including teeth of the helical and herringbone varieties.

Another important feature of the present invention is the provision of a step-up ratio between the driving spur gear 30 and the driven spur gear 86. In one specific embodiment of the invention for driving a small garden tractor, spur gear 30 was provided with twenty (20) teeth, spur pinions 72 were provided with twelve (12) teeth, and spur pinions 78 and driven spur gears 86 were each provided with sixteen (16) teeth, thus providing a step-up ratio of 20/12 or 1.667.

Another important feature of the present invention is the driving of the input shaft 28 and the driving spur gear 30 of the planetary gear train 26 by the drive shaft 20 at a constant speed. Thus, in the illustrated embodiment, suitable sprockets 90, 92 are respectively secured to extension 22 of drive shaft 20 and projecting portion 46 of extension 38 of input shaft 28, sprockets 90, 92 being drivingly connected by a conventional roller drive chain 94. In the above-referred to specific embodiment, sprockets 90, 92 were provided with seventeen (17) and thirty-five (35) teeth, respectively, thus providing a step-down ratio of 2.06 between the drive shaft 20 and the input shaft 28 of the planetary gear train 26.

Finally, in accordance with yet another important feature of the present invention, the carrier 48 of the planetary gear train 26 is driven by the drive shaft 20 at a variable speed from below to above that of the drive shaft 20. To provide this variable speed drive for the carrier 48, adjustable ratio pulleys 96, 98 are mounted on the drive shaft 20 and adjustable ratio pulleys 100, 102 are mounted on the extension 44 of the input shaft sleeve 40, the adjustable ratio pulleys 96, 100 and 98, 102 being drivingly connected by suitable belts 104, 106.

Adjustable ratio pulleys 96, 98 comprise fixed pulley parts 108, 110 respectively secured to extension 22 of drive shaft 20 in axially spaced-apart relationship in any suitable manner, as by set screws 112, 114, and adjustable pulley parts 116, 118 are respectively mounted on extension 22 of drive shaft 20 for limited axial movement. Pulley parts 108, 116 and 110, 118 respectively define adjustable-width grooves 120, 122 for the drive belts 104, 106.

Pulley parts 108, 110, 116, 118 respectively have a plurality of axially extending openings 124, 126, 128, 130 formed therethrough. Fixed pulley parts 108, 110 respectively have a plurality of projections 132, 134 which respectively extend axially through openings 128, 130 in the adjustable pulley parts 116, 118, projection 134 of fixed pulley part 110 engaging fixed pulley part 108, as shown. Adjustable pulley parts 116, 118 respectively have a plurality of projections 136, 138 respectively extending axially through openings 124, 126 in the fixed pulley parts 108, 110, projection 136 engaging adjustable pulley part 118. Adjustable pulley parts 116, 118 are secured together by means of threaded fasteners 140. Projections 138 have extension portions 142 which extend axially toward and into opening 16 in frame element 12. It will be observed that fixed pulley part 110 is adjacent frame element 12 and that axial movement of adjustable pulley parts 116, 118 in a direction shown by the arrow 144 toward frame element 12 narrows the grooves 120, 122, whereas axial movement of the adjustable pulley parts 116, 118 in the direction shown by the arrow 146 away from frame element 12 widens grooves 120, 122.

In order to provide for axial movement of the adjustable pulley parts 116, 118 and thus to adjust the width of grooves 120, 122, the arrangement now to be described is provided. An annular bushing member 148 is provided positioned within opening 16 in frame element 12 by retaining member 150. Retaining member 150 has a plurality of radially inwardly extending dogs 152 which respectively project into slots 154 in member 148, thus restraining member 148 against rotational movement but permitting axial movement of member 148. Member 150 is mounted on frame element 12 by means of suitable threaded fasteners 156. Member 148 has an annular flange portion 158 which extends radially inwardly and is engageable with a suitable annular thrust bearing member 160 secured to extension portions 142 of projections 138 of the adjustable pulley part 118. Member 148 has a plurality of helical cam surfaces 162 formed on its external surface, as shown.

An annular ratio adjusting member 164 is provided having internal helical grooves 166 formed therein. Member 148 is mounted within ratio adjusting member 164 with its helical grooves 162 respectively cooperatively seated in helical grooves 166. Ratio adjusting member 164 has an annular flange 168 extending radially outwardly therefrom and having slots 170 formed therein through which the threaded fasteners 156 extend. Flange 168 has an actuating lever portion 172 formed thereon for a purpose to be hereinafter more fully described. It will be seen that the ratio adjusting member 164 is mounted on the frame element 12 for limited rotational movement by the threaded fasteners 156. Ratio adjusting member 164 is, however, restrained against axial movement.

Referring now additionally to FIG. 2, it will be seen that rotation of member 164 in the direction shown by the arrow 174 will cause member 148 to be moved axially in a direction shown by the arrow 144 in FIG. 1, thus causing annular flange 158 to engage thrust bearing 160, thereby to move the adjustable pulley parts 116, 118 in the direction shown by the arrow 144 so as to narrow the belt grooves 120, 122. Rotation of ratio adjusting member 164 in the opposite direction, as shown by the arrow 176, will move member 148 axially in the opposite direction, as shown by the arrow 146, thus permitting adjustable pulley parts 116, 118 to move axially in the direction shown by arrow 146 under the influence of belts 104, 106 as the corresponding grooves in adjustable ratio pulleys 100, 102 are narrowed, as will be hereinafter described.

Adjustable ratio pulleys 100, 102 comprise fixed pulley parts 178, 180 respectively secured to extension 44 of input shaft sleeve 40 in any suitable manner, as by set screws 182, 184, and adjustable pulley parts 186, 188 respectively mounted on extension 44 of input shaft sleeve 40 for limited axial movement. It will be observed that adjustable pulley part 188 is adjacent frame element 12 and that fixed and adjustable pulleys parts 178, 186 and 180, 188 respectively define adjustable-width grooves 190, 192 for the belts 104, 106.

Each of the pulley parts 178, 180, 186, 188 has a plurality of axially extending openings 194, 196, 198, 200 formed therethrough. Fixed pulley parts 178, 180 respectively have a plurality of projections 202, 204 respectively extending into openings 198, 200 in adjustable pulley parts 186, 188, projections 202 on fixed pulley part 178 engaging fixed pulley part 180. Adjustable pulley parts 186, 188 respectively have projections 206, 208 respectively extending into openings 194, 196 in fixed pulley parts 178, 180, projections 208 on adjustable pulley part 188 engaging adjustable pulley part 186.

In order to provide for adjustment of the width of grooves 190, 192, an annular bushing 210 is provided seated in opening 212 coaxially surrounding extension 44 on input shaft sleeve 40. Bushing 210 is thus restrained against both axial and rotational movement. Bushing 210 has a plurality of cam surfaces 216 formed in its outer edge 218.

An annular ratio adjusting member 220 is provided mounted within opening 212 and having cam surfaces 222 formed thereon cooperating with cam surfaces 216 on the bushing 210. Ratio adjusting member 220 is thus mounted for rotational and axial movement with respect to the bushing 210 and frame element 12. Ratio adjusting member 220 has a suitable bearing 224 mounted therein coaxially surrounding extension 44 of input shaft sleeve 40 and engageable with an annular projection 226 on adjustable pulley part 188. Ratio adjusting member 220 has a radially outwardly extending lever portion 228 formed thereon.

It will now be seen that rotation of ratio adjusting member 220 in a direction shown by the arrow 176 in FIG. 2 will, through the cooperation of cam surfaces 216, 222, move member 220 axially in the direction shown by the arrow 146, thereby to push adjustable pulley parts 188, 186 axially in the direction shown by the arrow 146 so as to narrow grooves 190, 192. It will further be seen that rotation of member 220 in the opposite direction, as shown by the arrow 174, will, through the cooperation of cam surfaces 216, 222, move member 220 axially in the opposite direction, as shown by the arrow 144, thus permitting adjustable pulley parts 186, 188 to be moved axially in the direction shown by the arrow 144 so as to widen grooves 190, 192 under the influence of belts 104, 106, as grooves 120, 122 of adjustable ratio pulleys 96, 98 are narrowed by rotation of ratio adjusting member 164 in the direction shown by the arrow 174, as above described.

Lever portions 172, 228 of ratio adjusting members 164, 220 are respectively connected by a suitable link 230 to which a suitable operating rod member 232 is connected, as best seen in FIG. 2. Thus, it will be seen that actuation of rod member 232 in the direction shown by the arrow 234 will rotate ratio adjusting members 164, 220 in the direction shown by the arrows 176, thereby to narrow grooves 190, 192 of adjustable ratio pulleys 100, 102, forcing belts 104, 106 radially outwardly therein and thereby causing belts 104, 106 to move radially inwardly in grooves 120, 122 of adjustable ratio pulleys 96, 98, in turn forcing adjustable pulley parts 116, 118 outwardly to widen the grooves, as above described, and thus to drive input shaft sleeve 40 and carrier 48 of the planetary gear train 26 at a lower speed. On the other hand, it will be seen that actuation of the rod 232 in the opposite direction, as shown by the arrow 236, will rotate ratio adjusting members 164, 220 in the direction shown by arrows 174, thereby to move adjustable pulley parts 116, 118 of pulleys 96, 98 in the direction shown by the arrow 144 so as to narrow grooves 120, 122 and to force belts 104, 106 radially outwardly therein, in turn causing belts 104, 106 to move radially inwardly in grooves 190, 192 of adjustable ratio pulleys 100, 102 so as to force adjustable pulley parts 186, 188 axially in the direction shown by the arrow 144, and thus to drive input shaft sleeve 40 and carrier 48 of planetary gear train 26 at a higher rate of speed.

It will now be readily seen that carrier 48 of planetary gear train 26 is driven by the belts 104, 106 through adjustable ratio pulleys 96, 98 mounted on drive shaft 20 and 100, 102 mounted on input shaft sleeve 40 through a selectively continuously variable range of speed from below to above that of drive shaft 20. An important aspect of the present invention is the fact that a wide continuously variable range of output speeds of output shaft sleeve 82 is provided including zero and complete reversal with a smaller range of speed variation of the belts 104, 106 and adjustable ratio pulleys 96, 98 and 100, 102 than has heretofore been required. Prior variable speed drives of this general type known to the present applicant have required a variation in the adjustable ratio pulley drives from 2/1 to 1/2, which requires that the belts at the maximum ratio be operated much more deeply in the pulley grooves than is desirable. With the construction of the present invention, a variable belt ratio from 3/4 to 4/3 provides the same or a higher range of output speeds than has heretofore been provided with a variable belt ratio of 1/2 to 2/1.

In the above-described apparatus, the following formulae may be employed to closely approximate the operation of the apparatus. Where "F" is revolutions of carrier 48, "D" is revolutions of the driving gear 30 and "$r$" is the ratio of the gearing of planetary gear train 26, which, as indicated above, is always greater than one (1), and "$d$" is the number of revolutions of the driven gear 86, $d_1 = 1 - r$, "$d_1$" being the number of revolutions of driven gear 86 to produce one (1) revolution of carrier 48 with the driving gear 30 locked, it being observed that "$d_1$" is always a negative quantity, indicating that the driven gear 86 turns in a direction opposite from the direction of rotation of the carrier 48, $F_1 = 1/d_1$, "$F_1$" being the number of revolutions of the carrier 48 to produce one (1) revolution of the driven gear 86 with driving gear 30 locked, $$D_2 = 1 - \frac{1}{r}$$

"$D_2$" being the number of revolutions of the driving gear 30 to produce one (1) revolution of the carrier 48 with the driven gear 86 locked, and $F_2 = 1/D_2$, it being observed further that "$D$" is always a positive quantity, indicating that driving gear 30 and carrier 40 are rotating in the same direction. Starting with these basic formulae, $d_f = F \times d_1$, "$d_f$" being the number of revolutions of driven gear 86 with driving gear 30 locked, and $d_d = D \times r$, "$d_d$" being the number of revolutions of the driven gear 86 with the carrier 48 locked. It will be seen that "$d_r$" is the algebraic sum of $d_f$ and $d_d$, "$d_r$" being the resultant number of revolutions of the driven gear 86 with both the driving gear 30 and the carrier 48 rotating.

In the above specific embodiment of the invention incorporated in a garden tractor, $r = 1.667$      $D_2 = .4$
$d_1 = -.667$      $F_2 = 2.5$
$F_1 = -1.5$ Thus, with engine speed of 3000 r.p.m. and with a variable belt ratio of 3/4 to 4/3 and the ratio of engine speed to "D" being 2.06, $F = 2174$   4140 Actual
$d_f = 1450$   −2760 Theoretical
$d_r = 984$   −328 Actual
$d_d = 2432$   2432 Theoretical
$D = 1460$   1460 Actual In another embodiment in which:

$r = 3$      $D = .667$
$d_1 = -2$      $F_2 = 1.5$
$F_1 = -.5$ and in which a driving motor speed of 1700 r.p.m. is provided with the same 3/4 to 4/3 variable belt ratio and with a ratio of motor speed to D of 1.09:

$F = 1269\ 2418$ Actual
$d_f = -2538\ -4836$ Theoretical
$d_r = 2280\ -18$ Actual
$d_a = 4818\ 4818$ Theoretical
$D = 1606\ 1606$ Actual An examination of the above-stated formulae in connection with the foregoing specific embodiment will reveal that with adjustment of the adjustable ratio pulleys to provide a carrier speed exactly equal to that of the driving gear 30, i.e., 1606 r.p.m., the speed of the driven gear 86 "$d_r$" will likewise be 1606 r.p.m. It will thus be readily seen that by choosing a speed "D" for the driving gear 30, which falls between the upper and lower speeds of the carrier as determined by adjustment of the adjustable ratio pulleys, when the carrier speed "F" equals the driving gear speed "D," relative rotation of the gearing within the planetary gear train 26 is stopped and the gears are in essence locked relative to each other. It will further be seen that as the carrier speed "F" is increased above the driving gear speed "D," the relative rotation of the gearing in the planetary gear train 26 reverses, it being this characteristic of the system of the present invention which permits obtaining very high output speeds while nevertheless providing reversal at the low speed end. Thus, in yet another specific embodiment having a 1700 —r.p.m. driving motor with the same 3/4 to 4/3 variable belt ratio and a motor speed to "D" ratio of .8 with:

$R = 11$      $D_2 = .909$
$d_1 = -10$      $F_2 = 1.1$
$F_1 = -.1$

Then
$F = 1269\ 2418$ Actual
$D_f = -12690\ -24180$ Theoretical
$d_r = 11400\ -90$ Actual
$d_a = 24090\ 24090$ Theoretical
$D = 2185\ 2185$ Actual It will now be seen that by providing a planetary gear train or differential employing spur gearing with a step-up speed ratio between the driving sun gear and the driven sun gear, and by driving the carrier variably and the larger of the two sun gears, i.e., the driving gear, at a constant speed, it is possible to obtain a far wider variation in output speeds including reversal through zero (0) with a much smaller variation in the variable speed input than has heretofore been possible with prior variable speed drives of this type.

While there have been described above the principles of this invention in connection with specific apparatus, it is to be clearly understood that this description is made only by way of example and not as a limitation to the scope of the invention.

What is claimed is:

1. A variable speed drive comprising: a frame having first and second spaced elements; said first frame element having first and second spaced openings therein; a drive shaft extending through said first opening and having an extension on one side of said first frame element; a planetary gear train disposed between said first and second frame elements and having a first input shaft extending through said second opening, a second input shaft sleeve coaxially surrounding said first input shaft, bearing means rotatably supporting said second input shaft on said first frame element, said first and second input shafts being parallel with said drive shaft, said first and second input shafts having extensions on said one side of said first frame element, said first input shaft extension having a portion extending beyond said second input shaft extension, a driving spur gear on said first input shaft and rotatable therewith, a pinion carrier on said second input shaft and rotatable therewith, a pinion shaft carried by said pinion carrier and parallel with said input and drive shafts, an output shaft sleeve coaxially surrounding said first input shaft, bearing means rotatably supporting said first input shaft on said second frame element, a driven spur gear on said output shaft and rotatable therewith, a first spur pinion on said pinion shaft and meshing with said driving gear, and a second spur pinion on said pinion shaft and meshing with said driven gear, said pinions being fixedly connected; said driving and driven gears forming a step-up speed ratio between said driving and driven gears; drive means on said drive shaft extension and said first input shaft extension portion and rotatably coupling the same for driving said first input shaft at a constant predetermined speed; and selectively variable means rotatably coupling said drive shaft extension and said second input shaft extension for driving the same at selectively variable speeds from above to below the speed of said drive shaft.

2. The drive of claim 1 wherein said variable means comprises first and second groups of adjustable ratio pulleys, one of said groups being mounted on said drive shaft extension and the other being mounted on said second input shaft extension; said first group of pulleys comprising a plurality of fixed pulley parts secured to the respective shaft extension in axially spaced-apart relationship and a plurality of cooperating adjustable pulley parts axially movable on the respective shaft extension and mutually defining adjustable-width belt-receiving grooves with said fixed parts, there being a fixed part adjacent said first frame element, each of said parts having an opening extending axially therethrough, said fixed parts having projections extending through the opening of said adjustable parts and engaging the adjacent fixed part, said adjustable parts having projections extending through the openings of said fixed parts and engaging the adjacent adjustable part, said adjustable parts being secured together for simultaneous axial movement, the one adjustable part projection which extends through the one fixed part which is adjacent said first frame element having an extension portion thereon extending axially beyond one fixed part toward said first frame element, a first annular member coaxially surrounding the one shaft on which said first pulley group is mounted, means mounting said first annular member on said first frame element for axial movement and restraining rotational movement thereof, said first annular member having first cam means thereon, a second annular member coaxially surrounding said one shaft, means mounting said second annular member on said first frame element for rotational movement and restraining axial movement thereof, said second annular member having second cam means thereon cooperating with said first cam means whereby rotational movement of said second annular member causes axial movement of said first annular member, thrust bearing means on said one adjustable part extension portion engageable with said first annular member whereby rotation of said second annular member in one direction causes said second annular member to engage said thrust bearing means and to move the same and said adjustable parts axially toward said first frame element thereby to narrow the respective grooves; said second group of pulleys comprising a plurality of fixed pulley parts secured to the respective shaft extension in axially spaced-apart relationship and a plurality of cooperating adjustable pulley parts axially movable on the respective shaft extension and mutually defining adjustable-width belt-receiving grooves with said last-named fixed parts, there being an adjustable part adjacent said first frame element, each of said parts of said second group having an opening extending axially therethrough, said last-named fixed parts having projections extending through the openings of said last-named adjustable parts and engaging the adjacent fixed part, said last-named adjustable parts having projections extending through the openings of said last-named fixed parts and engaging the adjacent adjustable parts; a third annular member coaxially surrounding the other shaft on which said second pulley group is mounted, said third annular member being mounted on said first frame element and secured against axial and rotational movement, said third annular member having third cam means thereon, a fourth annular member coaxially surrounding said other shaft, said fourth annular member being mounted on said first frame element for rotational and axial movement with respect thereto, said fourth annular member having fourth cam means thereon cooperating with said third cam means whereby rotational movement of said fourth annular member causes axial movement thereof, said fourth annular member having thrust bearing means thereon and axially movable therewith, said last-named adjustable part which is adjacent said first frame element being enagageable with said last-named thrust bearing means whereby rotation of said fourth annular member in the direction opposite from said one direction of rotation of said second annular member causes said last-named thrust bearing means to engage said last-named adjacent adjustable part and to move the same and the remaining last-named adjustable parts axially away from said first frame element thereby to narrow the respective grooves; endless belts respectively drivingly connecting said first and second pulley groups and seated in the grooves thereof; said second and fourth annular members respectively having lever portions extending radially therefrom, and operating rod means connecting said lever portions for simultaneously rotating said second and fourth annular members in the same direction thereby to narrow the grooves of one of said pulley groups and to widen the grooves of the other group to vary the speed of said second input shaft.

3. A variable speed drive comprising: frame means having first and second spaced openings therein; a drive shaft extending through said first opening and having an extension on one side of said frame means; a driven shaft parallel with said drive shaft extending through said second opening and having an extension on said one side of said frame means; first and second groups of adjustable ratio pulleys, one of said groups being mounted on said drive shaft extension and the other being mounted on said driven shaft extension; said first group of pulleys comprising a plurality of fixed pulley parts secured to the respective shaft extension in axially spaced-apart relationship and a plurality of cooperating adjustable pulley parts axially movable on the respective shaft extension and mutually defining adjustable-width belt-receiving grooves with said fixed parts, there being a fixed part adjacent said frame means, each of said parts having an opening extending axially therethrough, said fixed parts having projections extending through the openings of said adjustable parts and engaging the adjacent fixed part, said adjustable parts having projections extending through the openings of said fixed parts and engaging the adjacent adjustable parts, said adjustable parts being secured together for simultaneous axial movement, the one adjustable part projection which extends through the one fixed part which is adjacent said frame means having an extension portion thereon extending axially beyond said one fixed part toward said frame means; a first annular member coaxially surrounding the one shaft on which said first pulley group is mounted; means mounting said first annular member on said frame means for axial movement and restraining rotational movement thereof, said first annular member having first cam means thereon; a second annular member coaxially surrounding said one shaft; means mounting said second annular member on said frame means for rotational movement and restraining axial movement thereof; said second annular member having second cam means thereon cooperating with said first cam means whereby rotational movement of said second annular member causes axial movement of said first annular member; thrust bearing means on said one adjustable part extension portion engageable with said first annular member whereby rotation of said second annular member in one direction causes said second annular member to engage said thrust bearing means and to move the same and said adjustable parts axially toward said frame means thereby to narrow the respective grooves; said second group of pulleys comprising a plurality of fixed pulley parts secured to the respective shaft extension in axially spaced-apart relationship and cooperating adjustable pulley parts axially movable on the respective shaft extension and mutually defining adjustable-width belt-receiving grooves with said last-named fixed parts, there being an adjustable part adjacent said frame means, each of said parts of said second group having an opening extending axially therethrough, said last-named fixed parts having projections extending through the openings of said last-named adjustable parts and engaging the adjacent fixed part, said last-named adjustable parts having projections extending through the openings of said last-named fixed parts and engaging the adjacent adjustable parts, a third annular member coaxially surrounding the other shaft on which said second pulley group is mounted, said third annular member being mounted on said frame means and secured against axial and rotational movement, said third annular member having third cam means thereon; a fourth annular member coaxially surrounding said other shaft and mounted on said frame means for rotational and axial movement with respect thereto, said fourth annular member having fourth cam means thereon cooperating with said third cam means whereby rotational movement of said fourth annular member causes axial movement thereof, said fourth annular member having thrust bearing means thereon and axially movable therewith, said last-named adjustable part which is adjacent said frame means being engageable with said last-named thrust bearing means whereby rotation of said fourth annular member in the direction opposite from said one direction of rotation of said second annular member causes said last-named thrust bearing means to engage said last-named adjacent part and to move the same and the remaining last-named adjustable parts axially away from said frame means thereby to narrow the respective grooves; endless belts respectively drivingly connecting said first and second pulley groups and seated in the grooves thereof; said second and fourth annular members respectively having lever portions extending radially therefrom; and operating rod means connecting said lever portions for simultaneously rotating said second and fourth annular members in the same direction thereby to narrow the grooves of one of said pulley groups and to widen the grooves of the other group to vary the speed of said driven shaft.

4. A variable speed drive comprising: a drive shaft; a planetary gear train including a first input shaft, a drive spur gear on said first input shaft and rotatable therewith, a second input shaft coaxial with said first input shaft, a pinion carrier on said second input shaft and rotatable therewith, a pinion shaft carried by said pinion carrier and parallel with said first and second input shafts, an output shaft coaxial with said input shafts, a driven spur gear on said output shaft and rotatable therewith, a first spur pinion on said pinion shaft and meshing with said driving gear and a second spur pinion on said pinion shaft and meshing with said driven gear, said pinions being fixedly connected, said driving and driven gears and said pinions forming a step-up speed ratio between said driving and driven gears; means coupling said drive shaft and first input shaft for driving the same at a constant predetermined speed; selectively variable means coupling said drive shaft and second input shaft for driving the same at selectively variable speeds; frame means; bearing means rotatably supporting said drive, input and driven shafts on said frame means; said variable means comprising adjustable ratio pulleys on said drive and second input shafts, respectively, with endless drive means drivingly connecting said pulleys, each of said pulleys including a part fixedly secured to the respective shaft and a cooperating axially movable part, said parts mutually defining an adjustable width groove for said drive means; first and second ratio adjusting means respectively mounted on said frame means coaxially surrounding said drive and second shafts, each of said ratio adjusting means comprising a first part restrained against rotation and having a first cam surface thereon and a second selectively rotatable part having a second cam surface thereon, one of said parts being axially movable, said cam surfaces cooperating whereby rotation of said second part moves the respective movable part axially, one of said movable parts engaging one of said adjustable pulley parts and moving the same axially in a direction to narrow the respective groove in response to rotation of the respective second part in one direction, the other of said movable parts engaging the other of said adjustable pulley parts and moving the same in a direction to narrow the respective groove in response to rotation of the respective second part in the opposite direction; operating means connected to both of said second parts of said adjusting means for simultaneously rotating the same in the same direction thereby to narrow one of said grooves and widen the other to vary the speed of said second input shaft; said first part of one of said adjusting means comprising a first annular member mounted on said frame means for axial movement with respect thereto, and said second part of said one adjusting means comprising a second annular member mounted on said frame means for rotational movement with respect thereto, said second member being restrained against axial movement, said first member engaging the respective pulley part.

References Cited

UNITED STATES PATENTS

| | | | |
|---|---|---|---|
| 1,983,132 | 12/1934 | Ives | 74—230.17 |
| 2,136,437 | 11/1938 | Hollestelle | 74—230.17 |
| 2,164,818 | 7/1939 | Heyer et al. | 74—689 |
| 2,196,606 | 4/1940 | Mason et al. | 74—230.17 |
| 2,317,095 | 4/1943 | Crafts et al. | 74—689 X |
| 2,478,870 | 8/1949 | Heyer | 74—689 X |
| 2,487,980 | 11/1949 | Otto | 74—230.17 |
| 2,516,173 | 7/1950 | Ballew | |
| 2,524,575 | 10/1950 | Shaw | 74—230.17 |
| 2,604,794 | 7/1952 | Scott | 74—230.17 |
| 2,702,484 | 2/1955 | Arath | 74—230.17 |

FOREIGN PATENTS

| | | |
|---|---|---|
| 993,867 | 11/1951 | France. |
| 916,511 | 7/1954 | Germany. |
| A.D. 6,850 | 7/1915 | Great Britain. |
| 453,330 | 10/1936 | Great Britain. |
| 473,170 | 7/1952 | Italy. |
| 78,935 | 3/1929 | Sweden. |

DONLEY J. STOCKING, *Primary Examiner.*

J. R. BENEFIEL, *Assistant Examiner.*